United States Patent [19]

Beebe et al.

[11] Patent Number: 5,014,551

[45] Date of Patent: May 14, 1991

[54] DAMPED HIGH SPEED TIRE TESTING MACHINE

[75] Inventors: James C. Beebe, Kent; Barry D. Cargould, Hudson, both of Ohio

[73] Assignee: Illinois Tool Works Inc., Glenview, Ill.

[21] Appl. No.: 410,935

[22] Filed: Sep. 22, 1989

[51] Int. Cl.⁵ ............................................. G01M 17/02
[52] U.S. Cl. ...................................................... 73/146
[58] Field of Search ........................................ 73/146, 8

[56] References Cited

U.S. PATENT DOCUMENTS

| | | | |
|---|---|---|---|
| 3,948,095 | 4/1976 | Burgett et al. | 73/146 |
| 4,422,336 | 12/1983 | Beebe | 73/769 |
| 4,619,142 | 10/1986 | Gisler | 73/477 |

Primary Examiner—Donald O. Woodiel
Attorney, Agent, or Firm—Wood, Herron & Evans

[57] ABSTRACT

A machine for measuring force variation or imbalance of tires particularly at high speeds. A rotating roadwheel is engaged by a tire mounted on a spindle. Force sensing means, such as load cells, are operably interposed between the tire spindle and a force sensor mount. To minimize the adverse effects of mechanical resonance of the machine on force measurement accuracy, the roadwheel and/or the force sensor mount are connected to ground through dampers which provide a damping ratio of at least about five percent and preferably higher. Where the force sensor mount is to be supported by such damping means, the invention further contemplates interposing a large mass between that damping means and the force sensor mount.

22 Claims, 2 Drawing Sheets

DAMPED HIGH SPEED TIRE TESTING MACHINE

BACKGROUND OF THE INVENTION

The invention relates to machines for measuring force variation or imbalance forces of rotating tires. More particularly, the present invention relates to a high speed tire testing machine including special damping means to reduce measurement errors due to mechanical resonance of the machine.

Known tire testing machines generally include a large diameter roadwheel rotatably mounted on a horizontal axis and a motor for rotating it. A tire spindle, to which the tire to be tested is mounted, is supported opposed to the roadwheel mounted in bearings. In order to generate electronic signals correlated with forces transmitted from the tire through the tire spindle, the machine includes a load cell assembly. That assembly comprises a load cell array disposed in force sensing relation between the tire spindle bearings and a load cell mount which is supported upon a rigid support structure. The load cells of the array are oriented to measure reaction forces between the tire and roadwheel and the tire along directions of interest which usually include three mutually orthogonal axes and two moments, the latter of which correspond to rocking of the tire spindle in vertical and horizontal planes, respectively. A reciprocable mechanism such as piston and cylinder is connected to the tire/tire spindle/load cell mount assembly to press the tire against the roadwheel with force sufficient to establish a desired radial load on the tire as it rotates in contact with the roadwheel and to retract the tire from engagement with the roadwheel upon completion of the test.

During testing, the roadwheel is driven to cause the tire to rotate at speeds corresponding to road speeds of up to 200 mph or higher while the load cells measure the forces of the tire as it rotates. In order to test at these speeds, a typically sized passenger car tire must rotate on the machine at a fundamental angular frequency of up to about 50 Hz. The machine must not only be capable of carrying out accurate force measurements not only at that fundamental tire rotational frequency but also at higher order harmonics thereof.

Every testing machine is characterized by one or more natural resonant frequencies usually including separate, although typically closely spaced, natural frequencies associated with both the roadwheel assembly and the structure supporting the combined tire/tire spindle/load cell mount assembly, respectively, both of which are typically about 50–60 Hz. In addition, the tire/tire spindle/load cell mount assembly itself has a characteristic natural frequency which is usually well in excess of 300 Hz and therefore not usually a problem since they ordinarily lie beyond the frequency measuring range of interest. When the frequency of tire rotation or any harmonics thereof coincide with one of these natural frequencies, the machine will resonate. As a consequence, the amplitude of force applied to the load cells at or near such frequencies could increase by a factor as high as 50. Thus, due to mechanical resonance a one pound force generated by the tire under test might transmit as much as fifty pounds to the load cell assembly thereby significantly degrading the accuracy of measurements made at or near a resonant frequency of the test machine.

The prior art has been to address the problem of mechanical resonance of the test machine by stiffening the machine in attempt to raise any significant resonant frequencies above the highest measuring frequency of the machine, i.e., above not only the fundamental tire rotational frequency but also above the highest harmonic thereof to be measured. Such stiffening has generally been attempted by constructing the machine of stiffer materials, and/or improving its bracing.

The tire industry continues to press for machines capable of measuring harmonics of higher and higher order. However, materials are not available to increase machine stiffness and therefore, resonant frequencies, indefinitely. While the stiffness of such a machine might be increased using the prior art techniques described above so that its lowest significant natural frequency approaches 150 Hz, such limits are simply not adequate to meet the goal of accurately measuring harmonics up to 300 Hz or even higher.

SUMMARY OF THE INVENTION

In view of the foregoing limitations of the prior art, it is an object of the present invention to provide a tire testing machine capable of carrying out accurate force measurements at higher frequencies than have heretofore been possible without relying on machine constructions requiring the use of stiffer structural members and/or more extensive use of rigidifying bracing than current technology affords. In order to achieve this, the present invention goes beyond the conventional teaching of the prior art which was to attempt to rigidify the machine to a point where it is not capable of resonating within the desired range of measuring frequencies. Instead of trying to prevent mechanical resonance from occurring, the invention adopts the novel and completely unobvious approach of providing enhanced damping at selected locations in order to minimize the adverse effects on accuracy which would otherwise occur due to resonance within the measuring range of even a reasonably stiff test machine.

More particularly, the invention contemplates providing damping means effective to limit the relative displacement occurring between the roadwheel and the mount of the load cell or other force sensor due to resonant excursions. In order to do so, the invention employs enhanced damping between the roadwheel and mechanical ground and/or the structure supporting the force sensor mount with respect to mechanical ground. Whereas testing machines of the prior art have had damping ratios of about 2.5% or less, the present invention contemplates providing an enhanced damping ratio of at least 5% and preferably 25% or higher. While those skilled in the art will readily appreciate that a number of damping techniques can be applied to provide such damping in one or more directions, a preferred embodiment of the invention to be described contemplates damping by forming at least a portion of the structure supporting the roadwheel and/or the force sensor mount of an aggregate dispersed in a binder medium such as epoxy. One such material is available under the trademark HARCRETE, a product of Hardinge Brothers, Inc. of Elmira, N.Y. By so doing, enhanced damping can be provided not only along the principal direction of resonant excursions but in other directions as well including along the typical three axes and two moments of measurement thereby mitigating the effects resonant modes in multiple directions.

Where such damping means are to be interposed between the force sensor mount and mechanical ground, a second aspect of the present invention contemplates interposing a member of significant mass between the force sensor mount and the damping means in order to resist the tendency of the load cell mount to move in unison with the damping means by providing sufficient inertia to ensure that forces transmitted from the tire will be accurately registered by the force sensors. Preferably, this mass is on the order of ten times the combined mass of the tire, the force sensor mount and all the mechanical components interposed between them including the tire spindle, its bearings and the force sensor assembly.

In a preferred embodiment, the massive member comprises upper and lower sections separated from one another along a horizontal plane. The tire spindle and force sensor assembly are mounted on the upper section and is driven by a hydraulic ram to force the tire against the roadwheel. The lower section of the member is mounted on damper, which is preferably formed of the aforementioned HARCRETE material. A hydraulic ram applies a vertical force to the upper section to clamp it rigidly to the lower section when the tire and roadwheel are in engagement in order that the upper and lower sections form a substantially unitary mass.

BRIEF DESCRIPTION OF THE DRAWINGS

The several features and objectives of the present invention will become more readily apparent from the following detailed description of the invention taken in conjunction with the accompanying drawings wherein like reference numerals refer to like elements and in which.

DETAILED DESCRIPTION OF THE INVENTION

Figure 1:
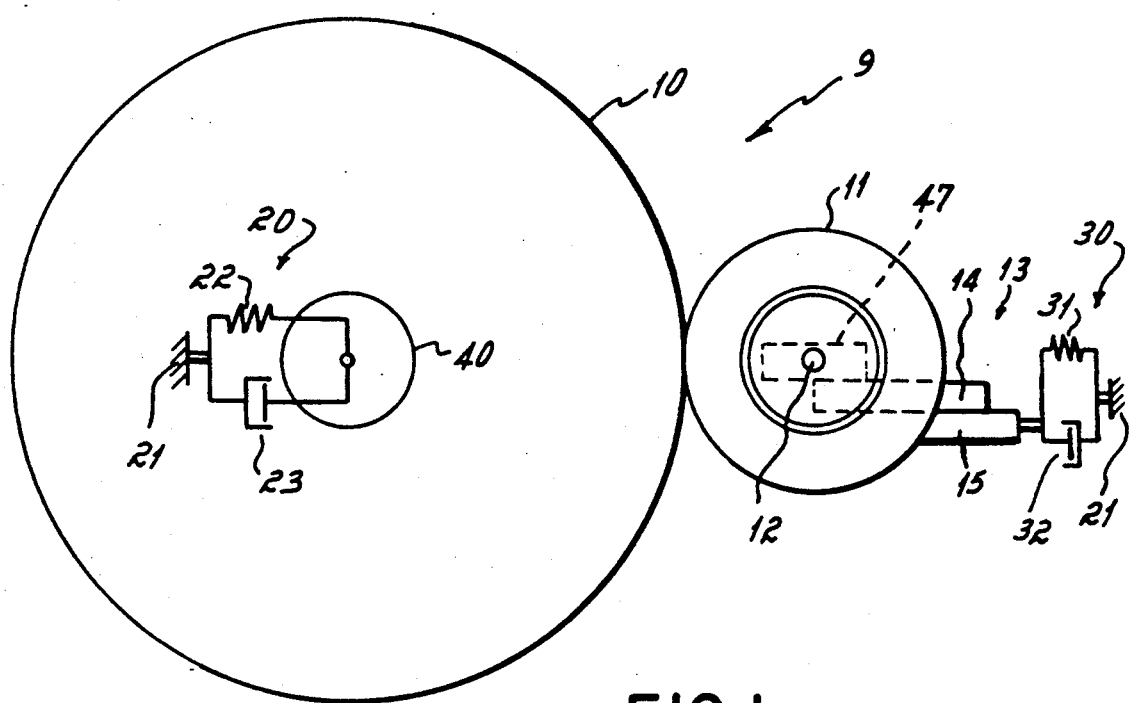
FIG. 1 is a schematic diagram illustrating the principles of the invention.

Referring to FIG. 1, a tire testing machine 9 includes a roadwheel 10 which is shown engaged by a tire 11. The tire is rotatably mounted upon a tire spindle 12 which is connected, by way of a load cell assembly 47 which in turn is mounted upon the upper section 14 of a massive member 13. The upper section 14 of member 13 is slidably mounted on a lower section 15. The member 13 is preferably of steel and about ten times the combined mass of the tire 11, load cell assembly 47 and all components interposed between them including tire spindle 12. In lieu of load cells it is to be understood that other force sensors capable of producing an electrical signal correlated with the force to which they are subject can be used.

The roadwheel 10 is connected to mechanical ground 21 by a damper 20 which, in FIG. 1 is schematically illustrated as a position-restoring spring 22 and a motion damper as represented by dashpot 23. In practice, damper 20 is preferably constructed as a casting of a material such as aggregate and interspersed in an energy absorbing binder. A preferred such material that sold under the trademark HARCRETE by Hardinge Brothers, Inc. of Elmira, N.Y. Of course, damper 20 may comprise any other equivalent structure capable of providing a damping ratio of at least about five percent (5%) and preferably twenty percent (20%) or higher. While in principle such damping need only be provided along the direction or directions along which resonant excursions take place within the range of measuring frequencies of the machine, damping is preferably provided along each non-rotational degree of freedom of roadwheel shaft 40. Thus, while the schematic representation of the damper 20 shown in FIG. 1 would indicate damping along only one axis, it is to be understood that damping is preferably provided for motion of roadwheel shaft 40 in all three axes as well as two moments along which machine 9 is to carry out force measurements.

On the side of machine 9 opposite roadwheel 10, massive member 13 is similarly mounted on a damper 30 which is schematically illustrated in FIG. 1 as a spring 31 and a dashpot 32. Like damper 20, damper 30 may comprise a casting material of the aforementioned HARCRETE or other structure capable of providing a damping ratio of at least about five percent (5%) and preferably twenty-five percent (25%) or higher. Again, it is to be understood that while damper 30 connecting member 13 to mechanical ground 34 is shown in FIG. 1 oriented along a single axis, in practice damping is preferably provided with respect to each measuring axis or moment subject to resonant excursions within the measuring frequency range of machine 9.

The massive mounting member 13 is important to provide assurance that forces transmitted to the load cells from tire spindle 12 are accurately registered by the load cells 64 and are not significantly attenuated by damper 30. These forces are transmitted to the load cells and then through the load cells to the member 13. Member 13 should have a mass which is large enough in relation to the total combined mass of the assembly which includes tire 11, tire spindle 12 and load cell assembly 47 that the inertia of member 13 will resist motion of member 13 when load cell 47 is subjected to forces expected to be encountered under test conditions including the forces owing to the inherent spring factor of the tire 11 under test. If member 13 is not sufficiently massive, it will move in response to that force and the load cells or other force sensors will not be subject to all of the force generated by the tire 11 and will therefore not produce an electrical signal which is accurately correlated with that force.

Figure 2:
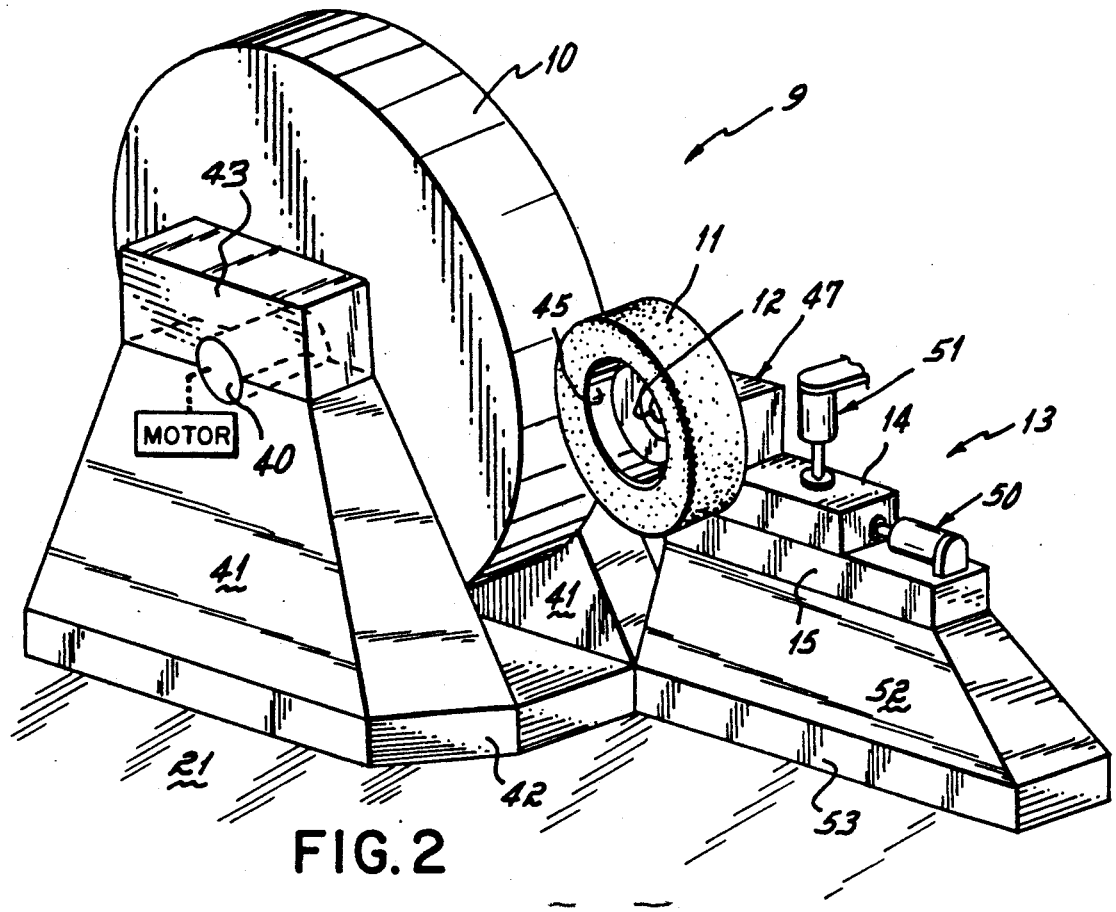
FIG. 2 is a diagrammatic perspective view of a tire testing machine constructed in accordance with the invention.

A preferred embodiment of principles of the present invention is depicted in FIG. 2. There, the roadwheel 10 is rotatably mounted on shaft 40 which projects from each side of the roadwheel 10. Each end of shaft 40 is mounted on the damper 20 of FIG. 1 which, as shown in FIG. 2, is formed as a pyramid 41 on each side of the roadwheel 10, the pyramid 41 being secured to a slab 42 which rests upon ground 21. As indicated above, the material of the pyramids 41 and slab 42 are preferably the combined aggregate and epoxy binder material such as the aforementioned HARCRETE. A roadwheel drive motor shown diagrammatically at 43 is mounted adjacent pyramid 41.

The tire 11 is mounted on a wheel 45, the wheel being connected to the spindle 12. The spindle is mounted on bearings which in turn communicate with a load cell assembly 47 to be described in more detail below. The load cell assembly 47 is mounted on the massive steel member 13. Although member 13 may suitably comprise a unitary member, it preferably includes an upper section 14 to which load cell assembly 47 is mounted and a lower section 15 which slidably supports the upper section 14. A piston and cylinder 50 is connected between the lower section 15 and upper section 14 to drive the upper section horizontally, bringing the tire 11 into contact with the roadwheel 10 for testing. A hydraulic clamp 51 or equivalent device is provided to apply force in a vertical direction clamping upper section 14 to lower section 15 when the tire is in engagement with the roadwheel so that upper and lower sections 14 and 15 are effectively coupled together to serve as a unitary massive member 13 when measurements are being taken.

Member 13 is supported on a pedestal or pyramid 52 preferably of HARCRETE atop a slab 53 of HARCRETE, the HARCRETE forming the vibration damper 30 of FIG. 1 and having the damping characteristics described above.

Figure 3:
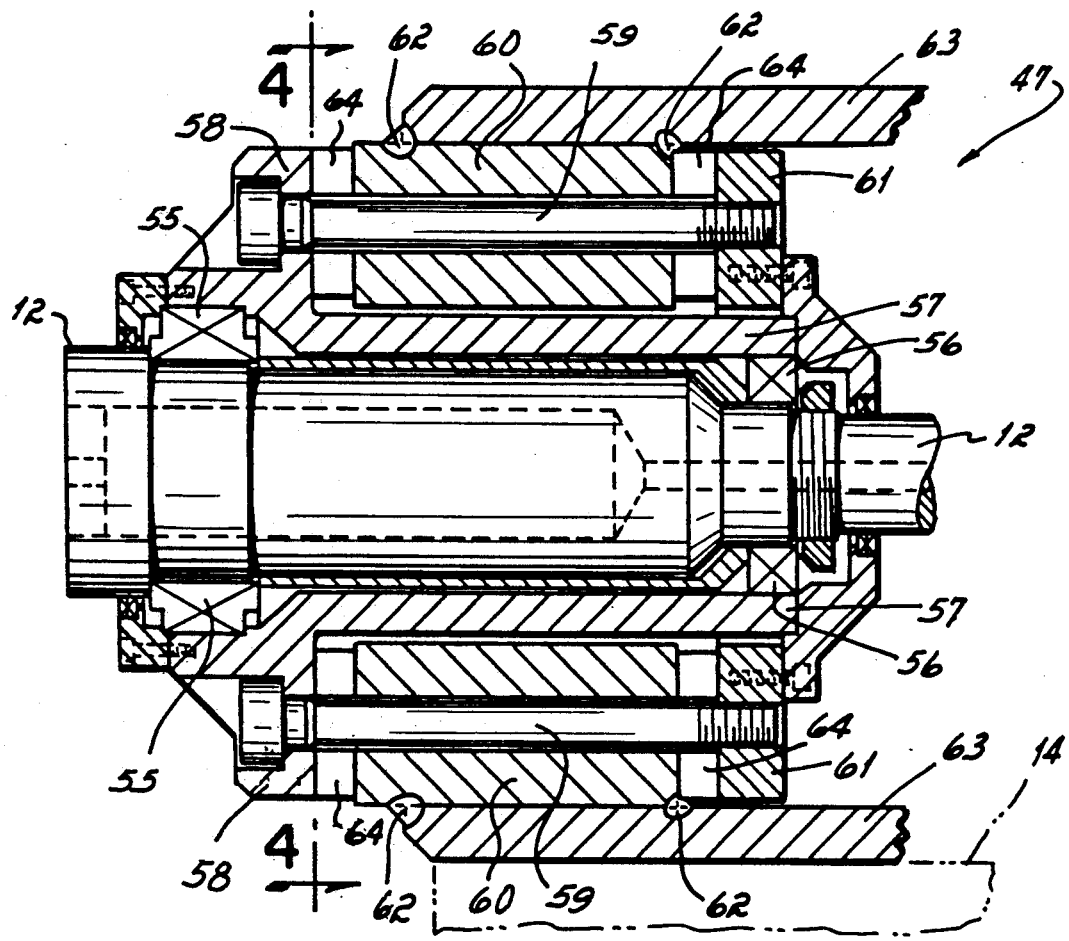
FIG. 3 is a longitudinal cross-sectional view through the axis of the load cell assembly of the machine shown in FIG. 2.
Figure 4:
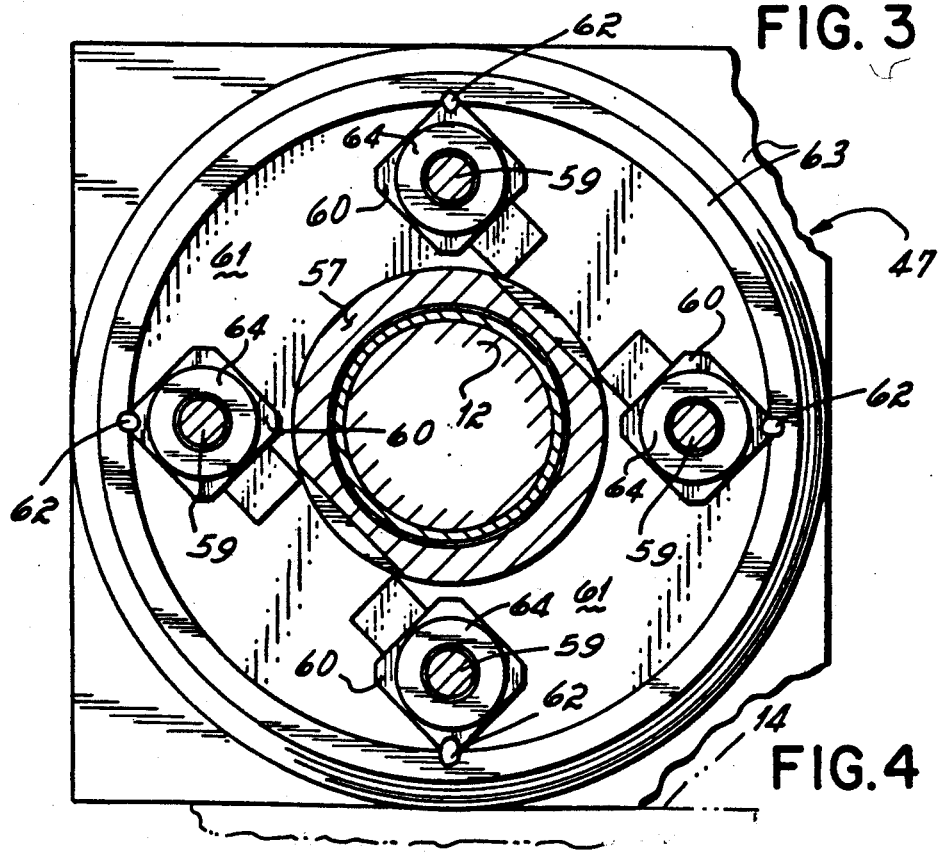
FIG. 4 is a cross-sectional view taken along line 4—4 of FIG. 3.

Load cell assembly 47 including the mounting of tire spindle 12 therein is depicted in FIGS. 3 and 4. There, tire spindle 12 is rotatably mounted in bearings 55 and 56 which are supported in a sleeve 57. The sleeve 57 has a flange 58 through which four equiangularly disposed bolts 59 pass. The bolts pass loosely through eight load cell 64 pairs which are separated by load cell spacers 60. The load cells 64 are clamped to the flange 58 by a plate 61 into which the bolts 59 are threaded. At each end of one corner 62 of each load cell spacer 60, the load cell spacers 60 are connected to the interior of a hollow, cylindrical load cell mount 63 which is rigidly fixed to the upper section 14 of massive member 13. The load cells are oriented to detect forces in all three mutually orthogonal axes as well as the two moments described above.

In the operation of the invention, a tire and wheel are mounted on the spindle 12. The piston and cylinder 50 are actuated to bring the tire into forceable engagement with the roadwheel 10. The piston and cylinder 51 are then actuated to clamp the upper section 14 to the lower section 15 effectively coupling them together as a unitary mass. The motor 43 drives the roadwheel 10 to cause tire 11 to rotate at angular speeds ranging up to about 50 Hz which is equivalent to causing the tire to run at an effective road speed of about 200 mph. The load cells 64 detect force variations and/or imbalance forces generated by the rotating tire. As those forces are transmitted from the tire 11 to the load cells 64 by way of tire spindle 12, the inertia of massive member 13 resists the tendency of load cell mount 63 to move thereby allowing the forces to be accurately registered by the load cells 64 rather than being significantly attenuated by damper 30. When the fundamental angular frequency or harmonics thereof of the rotation of tire 11 during testing is at or near the natural frequencies of either the roadwheel assembly and/or the structures supporting the tire/tire spindle/load cell assemblies, those structures will tend to resonate. However, due to the action of dampers 20 and/or 30 the amplitude of resonant excursions occurring between the surface of the roadwheel 10 and load cell mount 63 will be significantly attenuated thereby maintaining acceptable measuring accuracy notwithstanding the occurrence of such resonance.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A machine for measuring forces generated by a rotating tire, said machine comprising:
    a roadwheel;
    roadwheel mounting means for rotatably mounting said roadwheel;
    a tire spindle rotatably mounted juxtaposed said roadwheel for supporting a tire under test;
    means for rotating said tire and roadwheel in contact with one another;
    force sensor mounting means;
    force sensor means operably disposed in force sensing relation between said tire spindle and said force sensor mounting means for generating an electrical signal correlated with the forces transmitted to said force sensor means from said tire as it rotates in contact with said roadwheel, at least one of said force sensor mounting means and said roadwheel mounting means being subject during operation of the machine to resonance at one or more resonant frequencies lying within the measuring frequency range of the machine, and
    damping means supporting at least one of said roadwheel mounting means and said force sensor mounting means for damping the amplitude resonant excursions occurring between said roadwheel and said force sensor mounting means when said resonance at said one or more resonant frequencies occurs.

2. A machine as in claim 1 wherein said damping means are adapted to provide a damping ratio of at least about five percent.

3. A machine as in claim 2 wherein said damping means comprises an aggregate interspersed in a polymeric binder.

4. A machine as in claim 1 wherein said vibration damping means comprises:
    a pedestal formed of an aggregate interspersed in a polymeric binder.

5. A machine as in claim 1 wherein said damping means comprises:
    spring means disposed between said roadwheel and ground, and
    motion damper means mounted between said roadwheel and ground.

6. A machine as in claim 1 wherein said damping means comprises:
    spring means disposed between said force sensor mounting means and ground, and
    motion damper means mounted between said force sensor mounting means and ground.

7. A machine for measuring forces generated by a rotating tire comprising:
    a rotatably mounted roadwheel;
    a tire spindle rotatably mounted juxtaposed said roadwheel for supporting a tire under test;
    means for rotating said tire and roadwheel in contact with one another;
    force sensor mounting means;
    force sensor means operably disposed in force sensing relation between said tire spindle and said force sensor mounting means for generating an electrical signal correlated with the forces transmitted to said force sensing means from said tire as it rotates in contact with said roadwheel, at least one of said force sensor mounting means and said roadwheel being subject during operation of the machine to resonance at one or more resonant frequencies lying within the measuring frequency range of the machine; and damping means supporting said force sensor mounting means with respect to a mechanical ground for damping the amplitude of resonant excursions occurring between said roadwheel and said force sensor mounting means when said resonance at said one or more resonant frequencies occurs.

8. A machine as in claim 7 wherein said damping means are adapted to provide a damping ratio of at least about five percent.

9. A machine as in claim 7 wherein said damping means comprises an aggregate interspersed in a polymeric binder.

10. A machine for measuring forces generated by a rotating tire, comprising:
a rotatably mounted roadwheel;
a tire spindle juxtaposed said roadwheel for supporting a tire under test;
means for rotating said roadwheel and said tire in contact with one another;
force sensing means disposed in force sensing relation to said tire spindle for generating an electrical signal correlated with the forces transmitted to said force sensor means from said tire as it rotates in contact with said roadwheel, at least said roadwheel being subject during operation of the machine to resonance at one or more resonant frequencies lying within the measuring frequency range of the machine; and
damping means supporting said roadwheel for damping the amplitude of resonant excursions occurring between said roadwheel and said force sensor mounting means when said resonance at said one or more resonant frequencies occurs.

11. A machine as in claim 10 wherein said damping means are adapted to provide a damping ratio of at least about five percent.

12. A machine as in claim 10 wherein said damping means comprises an aggregate interspersed in a polymeric binder.

13. A machine for measuring forces generated by a rotating tire, comprising:
a rotatably mounted roadwheel;
a tire spindle juxtaposed said roadwheel for supporting a tire under test;
means for rotating said roadwheel and said tire in contact with one another;
force sensor mounting means;
force sensor means operably disposed in force sensing relation between said tire spindle and said force sensor mounting means for generating an electrical signal correlated with the forces transmitted to said force sensor means from said tire as it rotates in contact with said roadwheel, at least one of said roadwheel and said force sensor mounting means being subject during operation of the machine to resonance at one or more resonant frequencies lying within the measuring frequency range of the machine;
damping means supporting said force sensor mounting means for damping the amplitude of resonant excursions occurring between said roadwheel and said force sensor mounting means when said resonance at said one or more resonant frequencies occurs; and
a massive member disposed between said force sensor mounting means and said damping means.

14. A machine as in claim 13 wherein said member has a mass many times as large as the combined mass of the elements it supports.

15. A machine as in claim 13 wherein said massive member has a mass that is approximately ten times as large as the combined mass of the elements it supports.

16. A machine as in claim 13 wherein said member has a lower section and an upper section slidably mounted on said lower section, at least one of said sections being coupled to means for moving it toward said roadwheel to bring said tire into engagement with said roadwheel and to retract the tire away from the roadwheel upon completion of a test.

17. The machine of claim 16 further comprising:
means for selectively coupling said upper section rigidly to said lower section.

18. A machine for measuring forces generated by a rotating tire, said machine comprising:
a rotatably mounted roadwheel;
roadwheel mounting means for supporting said roadwheel;
a tire spindle rotatably mounted juxtaposed said roadwheel for supporting a tire under test;
means for rotating said tire and roadwheel in contact with one another;
force sensor mounting means;
force sensor means operably disposed in force sensing relation between said tire spindle and said force sensor mounting means for generating an electrical signal correlated with the forces transmitted to said force sensor means from said tire as it rotates in contact with said roadwheel, and
damping means supporting at least one of said roadwheel mounting means and said force sensor mounting means with respect to a mechanical ground to damp the amplitude resonant excursions occurring between said roadwheel and said force sensor mounting means when said machine resonates, said damping means providing a damping ratio of at least about five percent.

19. A machine as in claim 18 wherein said damping means comprises an aggregate interspersed in a polymeric binder.

20. A machine as in claim 18 wherein said vibration damping means comprises:
a pedestal formed of an aggregate interspersed in a polymeric binder.

21. A machine as in claim 18 wherein said damping means comprises:
spring means disposed between said roadwheel and ground, and
motion damper means mounted between said roadwheel and ground.

22. A machine as in claim 18 wherein said damping means comprises:
spring means disposed between said force sensor mounting means and ground, and
motion damper means mounted between said force sensor mounting means and ground.

* * * * *